Jan. 21, 1936.  W. C. GUIER  2,028,700
TRACTOR MOUNTED WINCH WITH DRIVE TRANSMISSION
Filed June 20, 1934  3 Sheets-Sheet 1
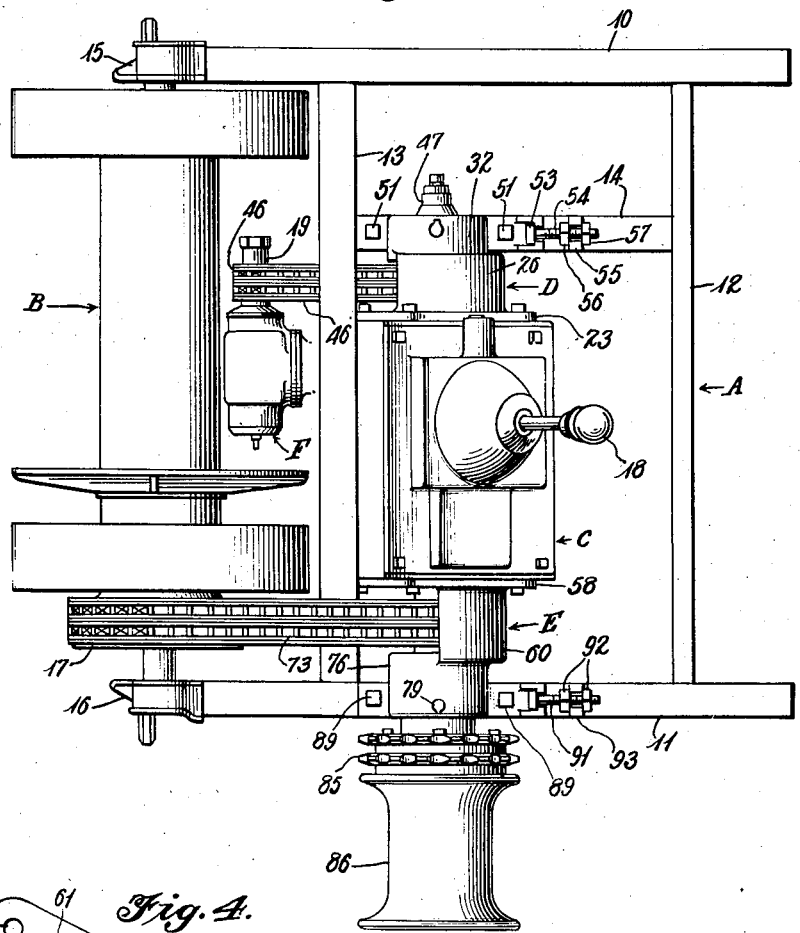
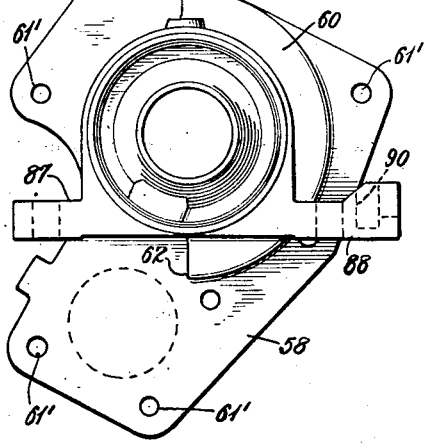
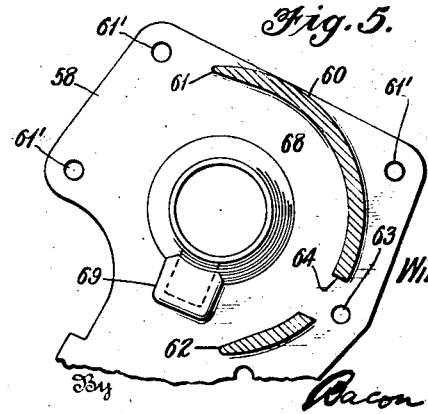
Inventor
William C. Guier.
By Bacon & Thomas
Attorneys Jan. 21, 1936.  W. C. GUIER  2,028,700
TRACTOR MOUNTED WINCH WITH DRIVE TRANSMISSION
Filed June 20, 1934  3 Sheets-Sheet 2
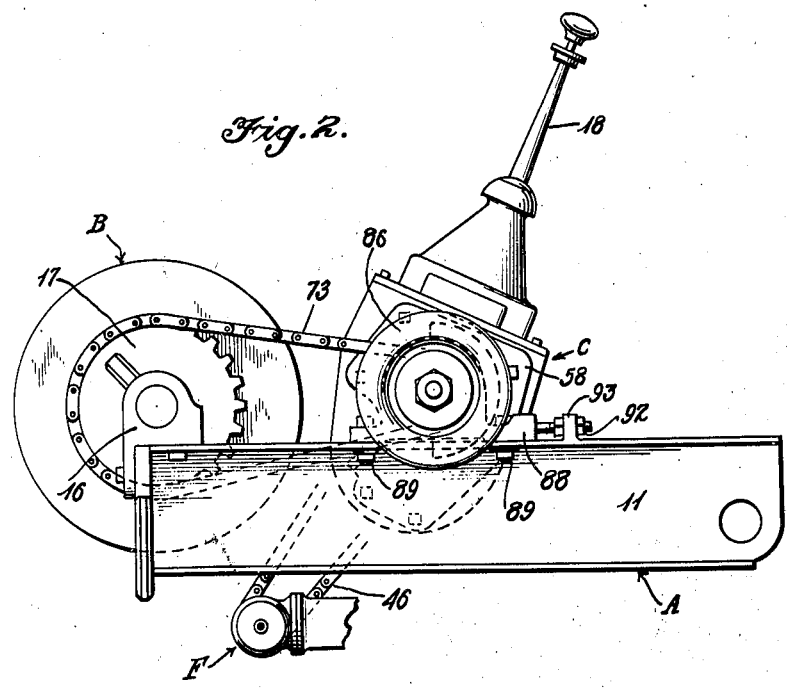
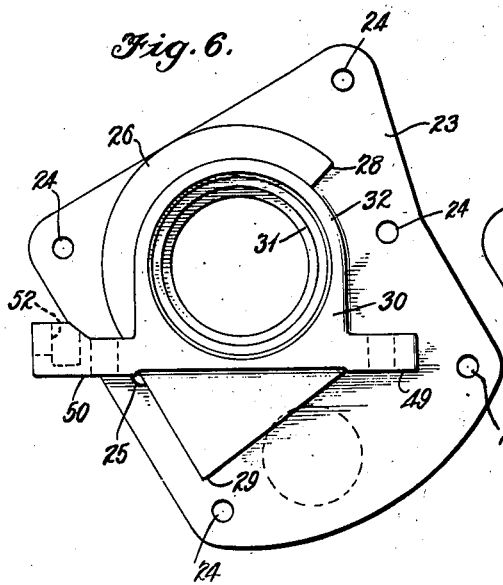 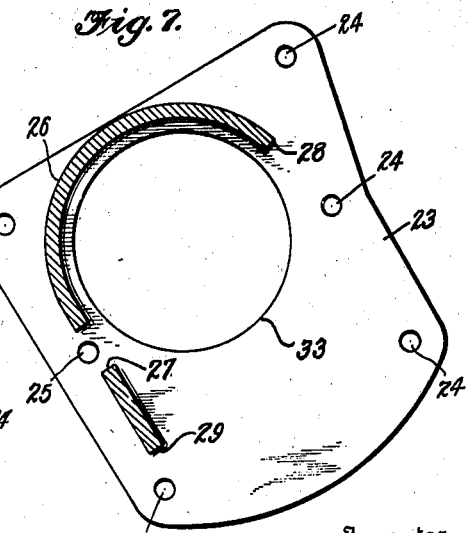
Inventor
William C. Guier
By Bacon & Thomas
Attorneys

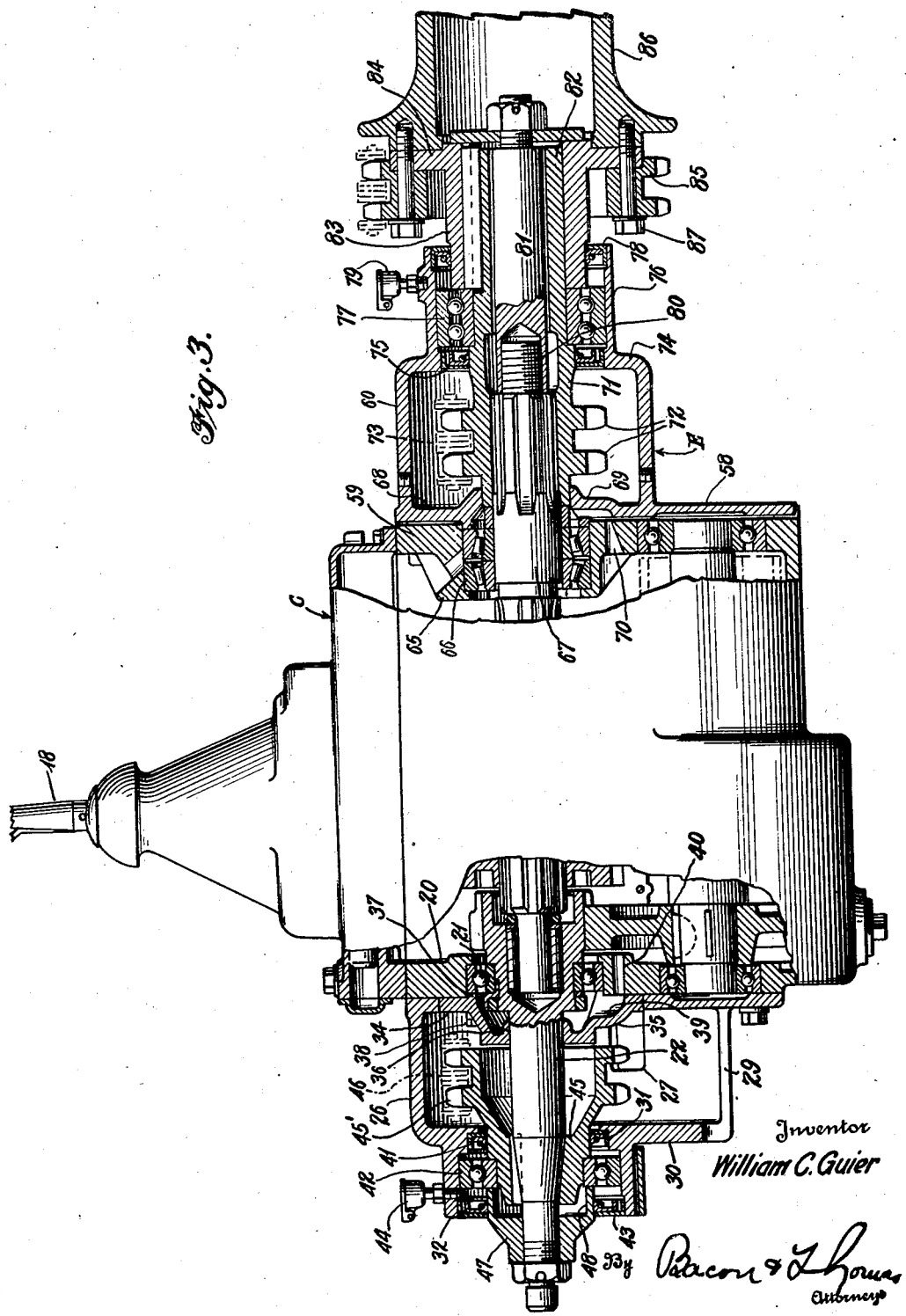

Patented Jan. 21, 1936

2,028,700

UNITED STATES PATENT OFFICE 2,028,700

TRACTOR MOUNTED WINCH WITH DRIVE TRANSMISSION

William C. Guier, Wichita, Kans., assignor to The All Steel Products Manufacturing Company, Wichita, Kans., a corporation of Kansas Application June 20, 1934, Serial No. 731,56*

14 Claims. (Cl. 254—187)

This invention relates to new and useful improvements in tractor mounted winches with drive transmission mechanism adapted for operating the winch from the prime mover of the associated tractor.

The primary object of the invention is to provide a winch assembly which is especially designed for being mounted upon a tractor and is especially suited for oil field work.

A further important object of the invention is to provide power connection attachment devices by means of which a conventional, variable speed transmission unit may be employed for transmitting power from a power take-off device on a tractor to a winch drum.

A still further object of the invention is to provide novel forms of drive connection attachments by means of which a conventional variable speed transmission unit may be mounted upon a suitable frame and capable of being adjusted to vary the tension placed on power input and power output sprocket chains.

Still another object of the invention is to provide mounting means for a standard variable speed transmission unit by means of which the unit may be held at an angle with respect to the perpendicular, whereby the unit may be mounted at a convenient location with respect to the operator's position and yet without interfering with other equipment associated with the supporting tractor and the winch.

Other objects and advantages of the invention will be apparent during the course of the following description:

In the accompanying drawings forming a part of this specification and in which like numerals are employed to designate like parts throughout the same, Figure 1 is a top plan view of the tractor mounted winch with its driving mechanism, embodying this invention;

Figure 2 is an elevational view of the power output end of the winch structure;

Figure 3 is a partly elevational view and partly vertical sectional view of a conventional variable speed transmission unit with novel drive connection attachments associated with the power input and power output ends of the unit;

Figure 4 is a detail end elevational view of the casing of the power output attachment shown in section in Fig. 3;

Figure 5 is a vertical sectional view of the casing unit shown in Fig. 4;

Figure 6 is a detail end elevational view of the power input attachment casing shown in section in Fig. 3; and Figure 7 is a vertical sectional view of the casing unit disclosed in Fig. 6.

Referring particularly to Figs. 1 and 2, there is disclosed a frame or chassis, designated in its entirety by the reference character A. This frame or chassis is suitable for supporting a drum and a variable speed transmission unit with suitable drive connections to provide a winch assembly adapted for being mounted upon a tractor. The details of a tractor structure have not been illustrated as, with the exception of the power take-off for the tractor, said details do not form a part of this invention. The frame or chassis A comprises a pair of parallel side beams 10 and 11. These beams are interconnected by transverse bars 12 and 13, which are spaced longitudinally of the side beams 10 and 11 and are suitably connected thereto. These transverse bracing bars 12 and 13 are interconnected by a bar 14 which is arranged in parallelism with the longitudinal beams 10 and 11.

A winch drum, designated in its entirety by the reference character B, is mounted by means of bearings 15 and 16 on the ends of the side beams 10 and 11. It is believed to be unnecessary to describe this winched drum in detail with the exception of stating that it includes a sprocket drive 17 properly associated with one end. It will be noted that the axis of rotation of the drum portion of the winch drum B extends transversely of the frame or chassis A.

A conventional variable speed transmission unit, designated in its entirety by the reference character C, is arranged with its longitudinal axis extending in parallelism with the winch drum B. The opposite ends of the conventional variable speed transmission unit C have connected thereto the power input attachment, designated in its entirety by the reference character D, and a power output attachment, designated in its entirety by the reference character E. It will be noted by inspecting Figs. 1 and 2 that these attachments D and E support the transmission on the bracing bar 14 and the main beam 11, with the normal central vertical plane of the transmission unit, which will extend longitudinally through the axis of the gear shift lever 18 for the transmission arranged at approximately a 45 degreee angle with respect to the perpendicular. This offsetting or angular arrangement of the transmission mechanism will enable the transmission to be mounted upon the frame or chassis A in a position which otherwise would be unavailable for this purpose in view of associated portions of the tractor, not shown. It is believed to be unnecessary to illustrate these portions of the tractor, as the fact that the transmission mechanism is mounted at an angle to the perpendicular is all that is of importance in disclosing this invention. The location of the operating knob on the upper end of the transmission gear shift lever 18 in an offset position or laterally of the side of the transmission unit, as best illustrated in Fig. 2, enables the transmission unit to be located at a greater distance from the operator's position and yet enables the operator to reach and properly manipulate the gear shift lever.

The reference character F is employed to designate in its entirety a power take-off attachment associated with and carried by the tractor upon which this winch mechanism is to be mounted. It is believed to be unnecessary to illustrate or describe the details of this power take-off mechanism other than to state that it is operatively connected to the prime mover or power plant of the tractor and has a sprocket wheel power output connection 19.

In Fig. 3 there is disclosed the conventional variable speed transmission unit C, partly in section and partly in elevation. The sectioned portions of this transmission unit clearly illustrate the manner in which the power input and power output connections or attachments are associated with the transmission unit and are coupled to the drive and driven shafts of the said unit. The power input attachment, shown at the left of Fig. 3, first will be described in connection with this figure and in connection with the detail showings in Figs. 6 and 7.

The conventional variable speed transmission unit C is provided with the usual end wall 20 which has an anti-friction bearing 21 mounted therein for supporting the transmission drive shaft 22, which projects through this end wall 20. In Figs. 3, 6 and 7, there is disclosed the input attachment casing structure which includes a mounting flange 23 by means of which the casing is detachably bolted to the end wall 20 of the transmission housing. The mounting flange has a plurality of apertures 24 which permit securing bolts to be passed therethrough for being threaded into suitable apertures formed in the transmission end wall 20. Fig. 7 discloses one bolt receiving aperture 25 which is located in alignment with a peripheral wall 26 of the attachment casing. The said wall 26, therefore, is apertured at 27 to accommodate the head of the bolt which passes through the opening 25. It will be understood that the various openings or apertures 24 and 25 are located in the mounting flange 23 at proper positions to line up with the threaded apertures which will be found in the end wall 20 of the conventional transmission C.

The peripheral wall 26 of the casing is cut away on one side, between the points 28 and 29, to allow for the passage of the sprocket chain, to be specifically referred to at a later point. In Figs. 3 and 6, the peripheral wall 26 of the casing is illustrated as being provided with an end wall 30 which is apertured at 31 and is provided with a bearing projection 32 of general tubular formation.

Fig. 7 discloses the fact that the mounting flange 23 is provided with an opening 33. This opening receives the flange 34 of a closure plate which is cupped at 35. This closure plate is apertured at 36 to permit the transmission drive shaft 22 to pass therethrough. An axially extending, circular flange 37 is formed on the mounting flange 34 and bears against the outer race of the anti-friction bearing structure 21 to retain this race in position in the end wall 20 of the transmission. Suitable bolts 38 are employed for securing this closure cap in place against the end wall 20 of the transmission. It will be noted that the cap is provided with a channel or groove 39 which communicates with the interior of the belled portion 35 of the cap and functions to drain lubricant from the anti-friction bearing 21 back into the interior of the transmission unit through the aperture 40 formed in the end wall 20 of the transmission.

The end wall 30 of the attachment casing has mounted in its aperture 31 a conventional sealing structure 41 which seals one side of an anti-friction bearing unit 42 mounted in the bearing extension 32 of the casing. The extremity of this bearing portion 32 has mounted therein a second conventional form of sealing structure 43. These sealing structures 41 and 43 exclude dirt and other foreign matter from the anti-friction bearing 42 and retain lubricant for the bearing which is supplied by the lubricating cup 44. The bearing 42 functions to receive the hub portion 45 of a sprocket structure which is keyed to the drive shaft 22 of the transmission. This sprocket structure includes the teeth 45' over which the sprocket chain 46 is trained. It will be noted by inspecting Figs. 1 and 2 that this sprocket chain 46 extends downwardly at an angle for driving connection with the sprocket wheel 19 of the power take-off F. Figs. 1 and 2 disclose the fact that this power take-off is located below the frame for the winch and has its longitudinal axis positioned between the longitudinal axes of the winch drum B and the transmission unit C. Suitably fastened upon the extremity of the transmission drive shaft 22, which projects beyond the hub 45 of the chain sprocket is a cap 47. This cap is cupped to provide an axially extending flange portion or ring 48 which is received within the sealing device 43.

Figs. 1 and 6 disclose apertured ears 49 and 50 adapted for receiving bolts 51 by means of which the transmission unit may be mounted upon and secured to the bracing bar 14 of the frame or chassis A. It is to be understood that the bolts 51 pass through longitudinally extending slots in the bar 14 by means of which the nuts associated with the bolts 51 may be tightened down to retain this input end of the transmission unit in any desired position of adjustment with respect to the bar 14. For the purpose of adjusting this end of the transmission unit longitudinally of the bar to vary the tension on the chain 46, the apertured ear 50 is provided with a pocket 52 adapted to receive the head 53 of an adjusting bolt 54. The mounting bar 14 has formed on the upper surface thereof a notched lug 55 which is designed to receive the adjustment bolt 54. Nuts 56 and 57 are threaded on the bolt and are used in an obvious manner to effect adjustment of the bolt 54 with respect to the lug 55 whereby the position of the input end of the transmission unit may be varied.

The output end of the transmission unit is illustrated in detail in Figs. 3 to 5 inclusive. This attachment includes a casing provided with a mounting flange 58 by means of which the attachment is bolted to the end wall 59 of the transmission unit C. The casing of the output attachment E is provided with a peripheral wall 60 which is cut away between the points 61 and 62 to accommodate a sprocket chain to be described in detail at a later point. The mounting flange 58 has suitable bolt receiving apertures 61' which function in the same manner as the apertures 24 of the mounting plate 23 for the input attachment. An aperture 63, for a securing bolt, is so positioned with respect to the peripheral wall 60 of the attachment casing that an aperture or opening 64 is provided in this wall to accommodate the head of the bolt which passes through the flange aperture 63.

The end wall 59 of the transmission housing is provided with an enlarged, apertured portion 65 which receives a double anti-friction bearing structure 66 designed to support the projecting end of the driven shaft 67 of the transmission unit C. The inner end wall 68 of the attachment housing is cupped at 69 and is provided with a central aperture for permitting the driven shaft to project into the interior of the attachment casing. The cupped portion 69 functions to conduct lubricant which has leaked past the anti-friction bearing structure 66 back into the interior of the transmission housing through the opening 70.

The portion of the driven shaft 67 which projects into the interior of the attachment casing is splined to receive the hub portion 71 of a sprocket wheel. This hub portion 71 is splined on the end portion of the driven shaft and has the peripheral chain engaging teeth 72 suitably formed thereon. Trained over these teeth 72 is a sprocket chain 73 which extends to and is trained over the sprocket wheel 17 of the winch drum B.

The outer end wall 74 of the attachment casing is apertured to receive the sealing device 75. A bearing projection 76, of tubular formation, is carried by the end wall 74 of the attachment casing and functions to receive an anti-friction bearing structure 77. The extremity of the bearing extension 76 has fitted therein, a sealing device 78. It will be seen that the sealing devices 75 and 78 function to retain lubricant for the anti-friction bearing 77, which lubricant is supplied by means of the cup 79.

The reduced extremity 80 of the transmission driven shaft 67 is externally threaded for connection with an extension shaft 81. This extension shaft 81 is fitted in and extends the length of the tubular extension 82 formed on the sprocket hub 71. This extension shaft acts as a support for the sprocket hub extension 82. Keyed to the extension 82 is the hub portion 83 of a power take-off coupling flange 84. In Fig. 3 there are illustrated a power take-off sprocket wheel 85 and a cable drum 86 as being bolted to the coupling flange 84 by means of the bolts 87. It is to be understood that either the power take-off sprocket wheel 85 or the cable drum 86 may be bolted to this coupling flange 84 by itself, or that both the sprocket wheel 85 and the cable drum 86 may be dispensed with entirely if desirable.

As in the case of the input power attachment, the bearing projection 76 of the output attachment E has formed thereon apertured ears 87 and 88 for receiving securing bolts 89 which pass through elongated slots, not shown, in the frame beam 11, by means of which the output end of the transmission unit may be rigidly fastened to the frame beam 11 in any desired position of adjustment. To effect movement of the output end of the transmission unit, to vary the tension of the sprocket chain 73, the apertured ear 88 is provided with a bolt receiving socket 90 for receiving the head of the adjustment bolt 91. This bolt has threaded thereon the nuts 92 which cooperate with the notched lug 93, carried by the frame beam 11. By manipulating the nuts 92, the output end of the transmission unit may be adjusted longitudinally of the frame beam 11.

It will be noted from the above detailed description of the various parts of this winch assembly that the winch drum B may be driven at various speeds and in opposite directions by means of the conventional variable speed transmission unit C by proper manipulation of the gear shift lever 18, in the ordinary manner. The power input and output attachments for the variable speed transmission unit C are designed to support the transmission unit at an angle with respect to the perpendicular and the casing structures of the two attachments suitably house the projecting ends of the transmission drive and driven shafts. These shafts are supported in bearings carried by the end walls of the transmission casing and have suitably keyed or connected thereto the input and output sprockets respectively. It will be noted that the casings for the attachments provide for the use of anti-friction bearing devices which receive portions of the sprocket hubs and support the sprockets and the projecting ends of the transmission drive and driven shafts outwardly of the teeth portions of the said sprockets, whereby the pull of the sprocket chains will not tend to bend the transmission shafts.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. A device of the type described comprising a supporting frame, a winch drum mounted on the frame, a variable speed transmission unit, means for adjustably mounting the said unit on the frame parallel to the winch drum and at an angle to the vertical, a source of power, a drive connection between the source of power and the input end of said transmission unit, and a drive connection between the output end of the transmission unit and the winch drum.

2. A device of the type described comprising a supporting frame, a winch drum mounted on the frame, a variable speed transmission unit, means for mounting the said unit on the frame parallel to the winch drum and at an angle to the vertical less than 90°, a source of power, a drive connection between the source of power and the input end of said transmission unit, and a drive connection between the output end of the transmission unit and the winch drum.

3. A device of the type described comprising a supporting frame, a winch drum mounted on the frame, a variable speed transmission unit, means for mounting the said unit on the frame parallel to the winch drum and at an angle to the vertical, a power take-off located below the frame and between the longitudinal axes of the winch drum and the transmission unit, a drive connection between the power take-off and the input end of said transmission unit, and a drive connection between the output end of the transmission unit and the winch drum.

4. A device of the type described comprising a supporting frame, a winch drum mounted on the frame, a variable speed transmission unit, means for mounting the said unit on the frame parallel to the winch drum, a power take-off located below the frame and between the longitudinal axes of the winch drum and the transmission unit, a chain and sprocket drive connection between the power take-off and the input end of the transmission unit, a chain and sprocket connection between the output end of the transmission unit and the winch drum, and means for bodily moving the transmission unit on said frame to adjust the tension of said drive connection chains.

5. A device of the type described comprising a supporting frame, a variable speed transmission unit, a detachable power connection attachment mounted on each end of the transmission unit, said attachments being constructed to support the weight of said unit on the frame.

6. A device of the type described comprising a supporting frame, a variable speed transmission unit, a power connection attachment mounted on each end of the transmission unit, said attachments being constructed to support the weight of said unit on the frame with the said unit being inclined from the perpendicular, and means for bodily moving the said unit relative to the frame.

7. A device of the type described comprising a housed variable speed gear transmission unit, a transmission shaft projecting from each end of said unit, and a power connection attachment for each end of the transmission unit, each attachment comprising a chain sprocket keyed to the projecting transmission shaft, a casing attached to the transmission housing and enclosing the said sprocket, and a bearing mounted in the casing and supporting the transmission shaft on the side of the sprocket removed from the transmission housing.

8. A device of the type described comprising a housed variable speed gear transmission unit, a transmission shaft projecting from each end of said unit, and a power connection attachment for each end of the transmission unit, each attachment comprising a chain sprocket having a hub keyed to the projecting transmission shaft, a casing attached to the transmission housing and enclosing said sprocket, and a bearing mounted in the casing and receiving the sprocket hub for supporting the sprocket and the projecting transmission shaft outwardly of the chain engaging portion of the sprocket.

9. A device of the type described comprising a housed variable speed gear transmission unit, a transmission shaft projecting from each end of said unit, and a power connection attachment for each end of the transmission unit, each attachment comprising a chain sprocket having a hub keyed to the projecting transmission shaft, a casing attached to the transmission housing and enclosing said sprocket, and a bearing mounted in the casing and receiving the sprocket hub for supporting the sprocket and the projecting transmission shaft outwardly of the chain engaging portion of the sprocket, and sealing means carried by the casing on the opposite sides of said bearing.

10. A device of the type described comprising a housed variable speed gear transmission unit, a transmission shaft projecting from each end of said unit, and an anti-friction bearing mounted in each end wall of the housing for supporting the transmission shafts where they project from the housing, and a power connection attachment for each end of the transmission unit, each attachment comprising a gear keyed to the projecting transmission shaft, a casing attached to the transmission housing and enclosing said sprocket, and means carried by the casing for returning to the transmission housing the lubricant which leaks past said anti-friction bearing.

11. A device of the type described comprising a supporting frame, a variable speed transmission unit having a shaft projecting from an end thereof, a power connection attachment mounted on the end of the transmission unit from which said shaft projects, and means associated with the said attachment and the frame for adjusting the position of the transmission relative to the frame.

12. A device of the type described comprising a supporting frame, a variable speed transmission unit having a power shaft projecting from the end thereof, and a power connection attachment mounted on said end of the transmission unit, said attachment comprising a chain sprocket keyed to the transmission shaft, a casing attached to the transmission housing and enclosing the said sprocket, a bearing extension carried by said casing, and an anti-friction bearing received in said extension and supporting the sprocket and the transmission shaft at a point removed from the transmission housing.

13. A device of the type described comprising a supporting frame, a variable speed transmission unit having a transmission shaft projecting from the end wall thereof, and a power connection attachment mounted on said end wall of the transmission unit, said power connection attachment comprising a chain sprocket keyed to the transmission shaft, a casing bolted to the end wall of the transmission housing and enclosing said chain sprocket, said casing having a bearing projection, an anti-friction bearing received in said projection and adapted to support the projecting end of the transmission shaft and the chain sprocket, a cap secured to the extremity of the transmission shaft and a sealing device interposed between a portion of the cap and a portion of the bearing projection of the casing.

14. A device of the type described comprising a supporting frame, a variable speed transmission unit having a transmission shaft projecting from one end wall thereof, and a power connection attachment mounted on said end wall of the transmission unit, said attachment comprising a shaft extension connected to the transmission shaft, a chain sprocket having a hub portion keyed to the transmission shaft and a hub extension enclosing the shaft extension, a casing secured to the end wall of the transmission housing and enclosing the said sprocket, an anti-friction bearing device carried by the casing for supporting the sprocket, the transmission shaft, and the shaft extension at a point removed from the transmission housing, and power take-off means keyed to the sprocket hub extension outwardly of the casing.

WILLIAM C. GUIER.